Aug. 27, 1940.　　　T. L. GREEN ET AL　　　2,212,860
BISCUIT MACHINERY
Filed March 7, 1936　　9 Sheets-Sheet 1

INVENTORS.
THOMAS L. GREEN, DECEASED.
By JAMES W. NOEL, EXECUTOR.
And CHARLES H. WILLIAMS.
BY
ATTORNEY

Aug. 27, 1940.         T. L. GREEN ET AL                    2,212,860
                        BISCUIT MACHINERY
                  Filed March 7, 1936        9 Sheets-Sheet 7

INVENTORS.
THOMAS L. GREEN, DECEASED
By JAMES W. NOEL, EXECUTOR.
AND CHARLES H. WILLIAMS.
BY
                              ATTORNEY

INVENTORS.
THOMAS L. GREEN, DECEASED.
BY JAMES W. NOEL, EXECUTOR.
AND CHARLES H. WILLIAMS.

BY
ATTORNEY

Aug. 27, 1940.    T. L. GREEN ET AL    2,212,860
BISCUIT MACHINERY
Filed March 7, 1936    9 Sheets-Sheet 9

INVENTORS.
THOMAS L. GREEN, DECEASED.
By JAMES W. NOEL, EXECUTOR.
AND CHARLES H. WILLIAMS.
BY
ATTORNEY

Patented Aug. 27, 1940

2,212,860

UNITED STATES PATENT OFFICE 2,212,860

BISCUIT MACHINERY

Thomas L. Green, deceased, late of Indianapolis, Ind., by James W. Noel, executor, Indianapolis, Ind., and Charles Herbert Williams, Indianapolis, Ind.; said Williams assignor to said James W. Noel, executor Application March 7, 1936, Serial No. 67,692

10 Claims. (Cl. 107—7)

This invention relates to the high-speed mass production of biscuit and equivalent articles by means of automatic machinery, and pertains more particularly to the coordination of biscuit-forming means with means for transporting and delivering the biscuit, in desired relationships, to receiving means, such as pans, oven bands or the like, upon which the biscuit may be received or conveyed into ovens for the baking operation.

Among other objects, this invention is intended to supply efficient high-speed apparatus capable of operation with great precision in the deposit of biscuit in predetermined and variable relationships upon the receiving means, with minimum tendency, even at high speeds, to dislocate the biscuit or to disturb the relationships in which they are intended to be arranged for baking.

An illustrative embodiment of the invention is shown in the accompanying drawings, in which

Figure 4 is a section on the vertical plane of the line 4—4 of Figure 6;

Figure 2:
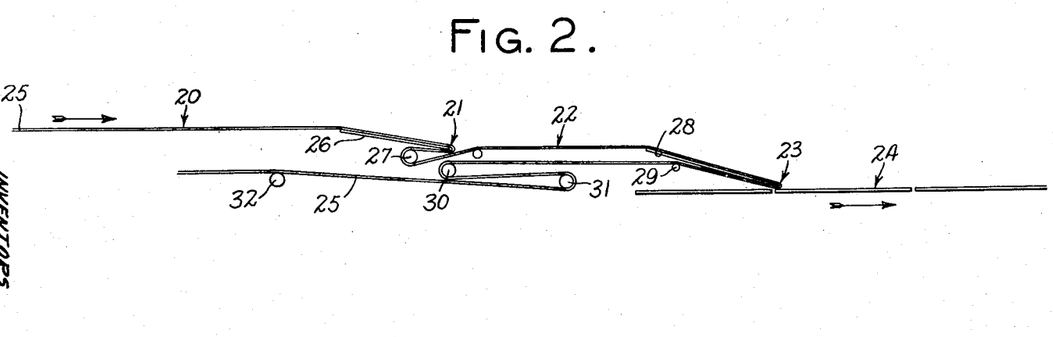
Figure 2 is a diagrammatic view, in side elevation, showing the several areas of aprons, and receiving means, upon which the biscuit are transported.

The specific apparatus selected for illustration is diagrammed in Figure 2 to indicate a succession of biscuit-supporting areas, comprising the apron area 20, supplied by a traveling apron, which transports the biscuit from the biscuit-forming mechanism toward a first delivery point 21; a second or transfer area 22 supplied by a traveling apron, to which the biscuit are delivered at the point 21, to be transported to the second delivery point 23; and a third area 24 upon which the biscuit are eventually received from the point 23 to be conveyed, in one way or another, into or toward the baking operation.

In the illustrative machine, the two areas 20 and 22 are supplied by different parts of a single continuous apron 25 which is conducted over the delivery points 21 and 23 and over the several rollers and along the meandering path diagrammed in Figure 2. That part of the apron which supplies the main delivery area 20 passes over a guide blade 26 to the delivery point 21, and thence over a roller 27 having a fixed axis. Thence this same apron, for the purposes of this particular machine, passes beneath the delivery point 21, to supply the transfer area 22 extending over a blade 28 to the second delivery point 23. Thence the apron passes beneath the blade 28, over a roller 29, and over rollers 30 and 31 which are so related, as presently explained, as to supply a take-up under certain conditions of operation of that part of the apron which supplies the area 22. Finally the apron passes over a roller 32 and ultimately to a driving drum near the left-hand extremity of the biscuit-forming machine which is not necessary to be shown in the drawings.

The described arrangement of the continuous apron 25 and the related blades and rollers, is such as to separate the main delivery area 20 and the transfer area 22, as regards their respective functions, and to permit the operation of that part of the apron which supplies the area 22 to be controlled and varied, to suit the purposes of the machine, without necessarily affecting the operation of that part of the apron which supplies the area 20, which latter operation may be continuous and uniform without reference to the variables imposed upon the operation of the area 22.

For the purposes of the specific machine, the blade 26, whose edge supplies the delivery point 21, may be stationary so that the point 21 may remain fixed in operation although susceptible of adjustment. The blade 28, however, whose edge supplies the second delivery point 23, is arranged to be moved so that the point 23 may be reciprocated in substantially a horizontal plane, subject to adjustments of speed of movement and amplitude of reciprocation, for purposes hereinafter explained. By a special character of compensating or takeup mechanism, including the parts 99, 101, 102, 104, 108 (Fig. 1) provision is made for increasing and decreasing the length of the upper run of the apron 25 in the rear of the reciprocating point 23, i. e., between that point and the oncoming supply of biscuit from the forming mechanism 40; and these changes in apron length, subject to various adjustments, may be made in desired conformity with the reciprocation of the point 23 so as to aid in controlling the travel of the apron relative to said point.

One noteworthy capacity of the arrangement just mentioned is this: For any given set of adjustments in the machine, the upper run of the apron 25 may be driven continuously at uniform linear speed, while the special compensating or takeup mechanism may store up, so to speak, the oncoming upper run of the apron, and then let it out, so that at times the apron at the point 23 is rendered functionally stationary, and at other times is caused to travel past the point 23, to suit the different requirements of the biscuit delivery operations. The effect is that the biscuit-carrying section of the apron, at and just in the rear of the point 23, is intermittently traveling, being functionally stationary during one part of its cycle and positively advanced over the point 23 during another part of its cycle, in spite of the fact that the remoter sections of the upper run of the apron 25 are continuously oncoming from the forming mechanism 40. For the purposes just indicated, the present illustrative machine employs certain mechanical principles disclosed in the patent to Green and Williams No. 1,868,317 dated July 19, 1932, wherein, especially in Figure 4, appears a compensating or takeup mechanism for varying the length of the upper run of an apron in coordination with a horizontally reciprocating delivery point, that being, it is believed, the first occurrence of that combination in the art.

In one form of the invention, the receiving area 24 may comprise a succession of pans mounted upon a pan carrier chain so that the pans will move progressively past the delivery point 23 to receive their respective loads of biscuit, after which the pans may be removed by hand or otherwise transported to an oven. Although certain features of the invention are particularly advantageous when used for depositing biscuit upon pans, the employment of pans, in lieu of some other form of biscuit-receiving means, is not essential to other aspects of the invention.

Figure 1:
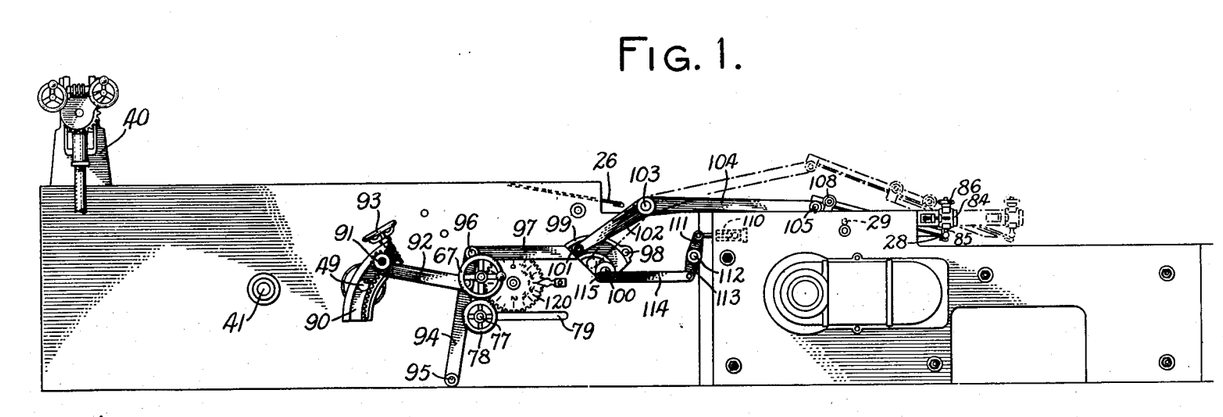
Figure 1 is a side elevation of a machine, indicating a biscuit-cutting head, at the left, to exemplify biscuit-forming mechanism, and showing the general assembly of the transporting and delivering elements.

Referring to Figure 1, the mechanism 40 illustrates a cutter head of conventional design operated for forming biscuit on the main delivery area 20 of the apron 25.

Figure 4:
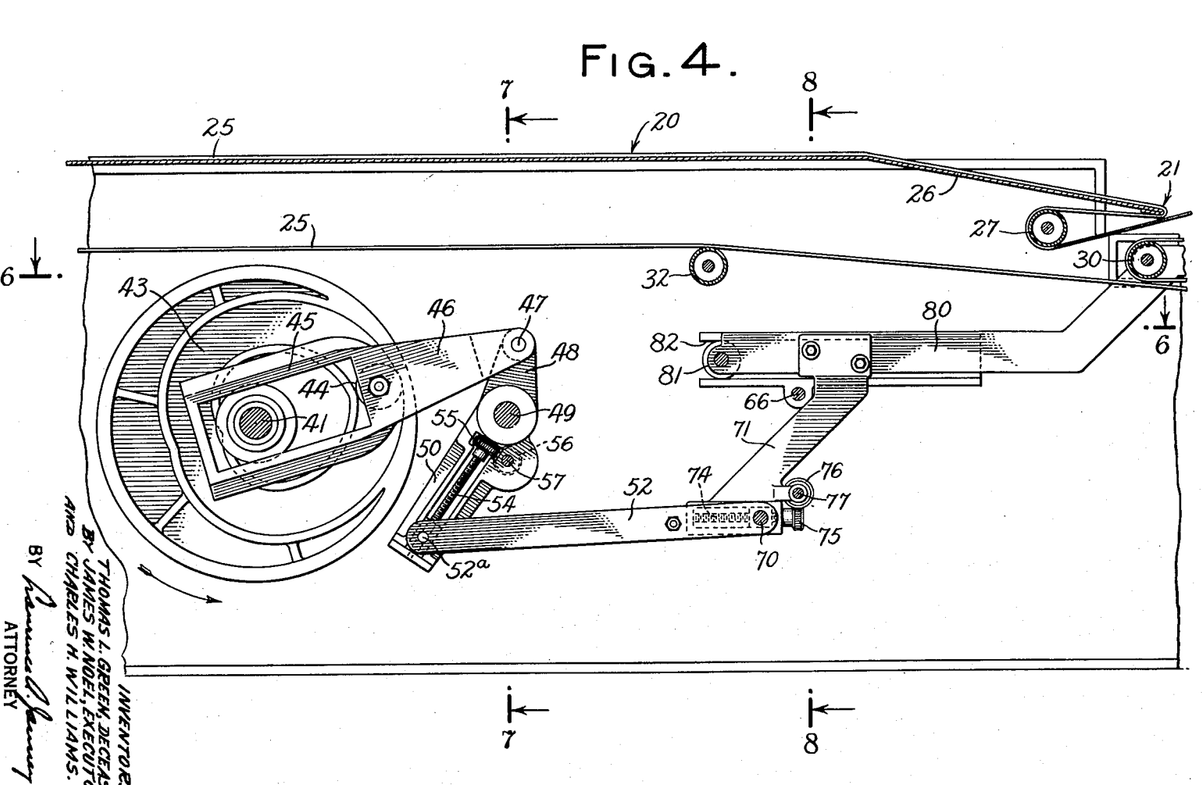
Figures 4 and 5 are vertical longitudinal sections on the planes indicated by the lines 4—4 and 5—5 of Figure 3, certain of the details shown at the right-hand end of Figure 4 being duplicated at the left-hand end of Figure 5 so that these two figures may be read together.
Figure 6:
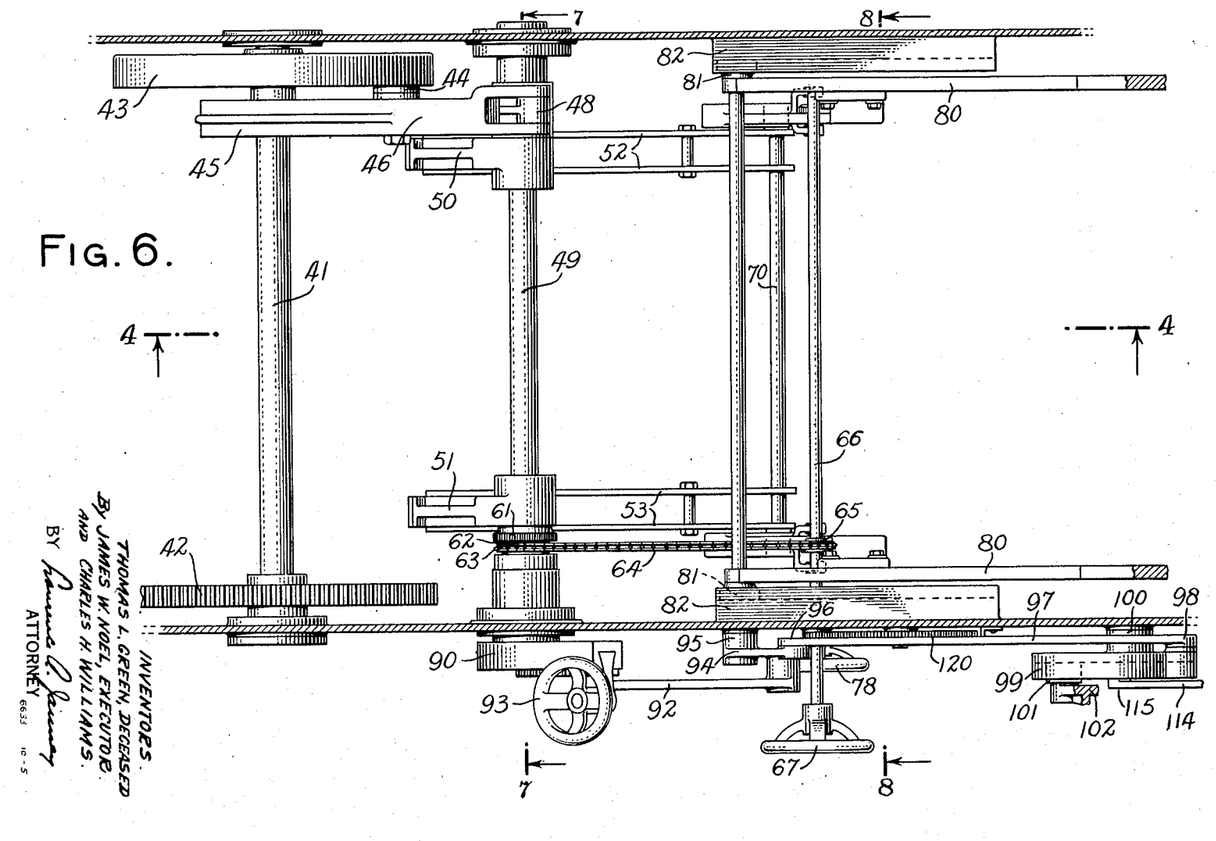
Figure 6 is a horizontal section on the plane indicated by the line 6—6 of Figure 4.

A cam shaft 41, shown in Figures 4 and 6, is mounted in the frame of the machine, and is driven through a gear 42 from a source of power not necessary to be shown. The shaft 41 has fixed upon it a path cam 43 engaged by a roller 44 mounted upon a yoke 45 having the extended arm 46 pivoted at 47 to an arm 48 fixed upon a rock shaft 49. As the cam shaft 41 is rotated, it rocks the arm 48 and its shaft 49.

Figure 7:
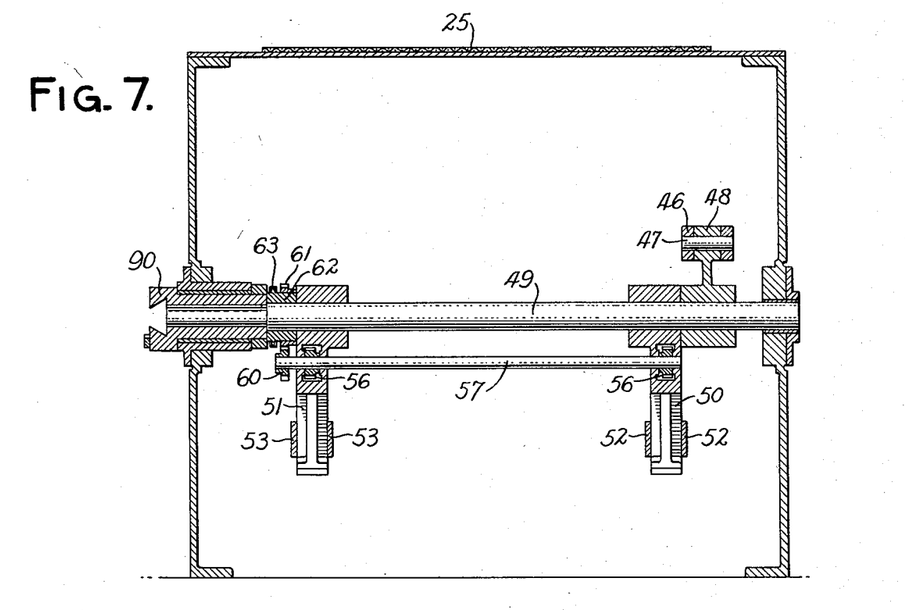
Figure 7 is a transverse section on the vertical plane of the lines 7—7 of Figures 4 and 6.

Also fixed on the shaft 49, to rock therewith, are two arms 50, 51 (Figure 6) pivotally connected to links 52, 53. As shown in Figure 4, the left-hand end of the link 52 is pivoted to a block which is threaded upon a screw shaft 54 mounted in the arm 50 and having at its opposite extremity a spiral gear 55 engaging a second spiral gear 56 mounted upon a shaft 57. As shown in the transverse section of Figure 7, the shaft 57 has two spiral gears 56, 56 relating respectively to the arms 50 and 51; and at the left-hand end of the shaft 57 it carries a gear 60 meshing with a gear 61 fixed upon a sleeve 62 which carries a sprocket 63 connected by a chain 64 (Figure 6) with a sprocket 65 fixed upon a shaft 66 extending to the exterior of the side of the machine, where it carries a hand wheel 67. By turning this hand wheel and rotating the shaft 66 in one direction or the other, the pivotal attachment 52a (Figure 4) between the link 52 and the arm 50, may be moved radially toward and from the axis of the rock shaft 49 so as to vary the throw of the link 52. This same adjustment takes place simultaneously with reference to each of the arms 50, 51 to vary correspondingly the throws of the links 52, 53 (Figure 6).

Figure 8:
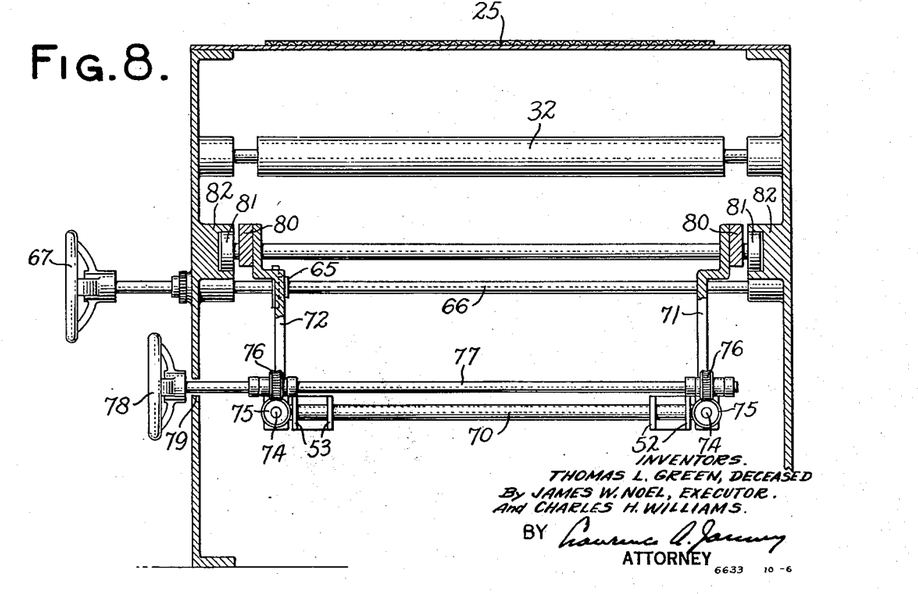
Figure 8 is a transverse section on the vertical plane of the lines 8—8 of Figures 4 and 6.
Figure 9:
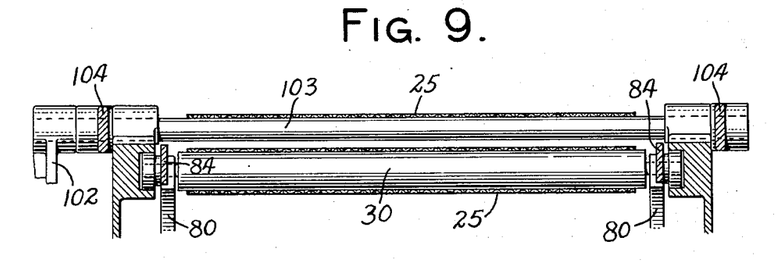
Figure 9 is a transverse section on the vertical plane of the line 9—9 of Figure 5.
Figure 10:
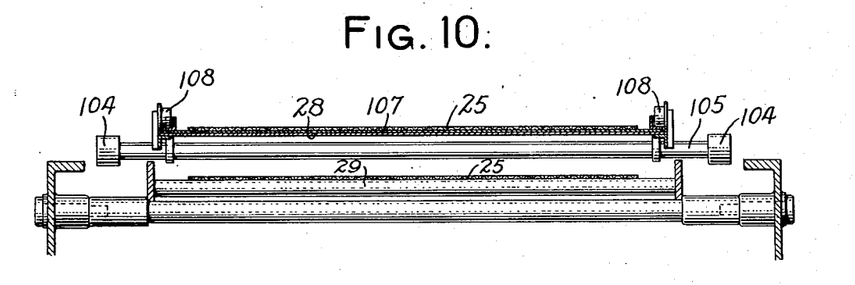
Figure 10 is a transverse section on the staggered planes of the line 10—10 of Figure 5.
Figure 11:
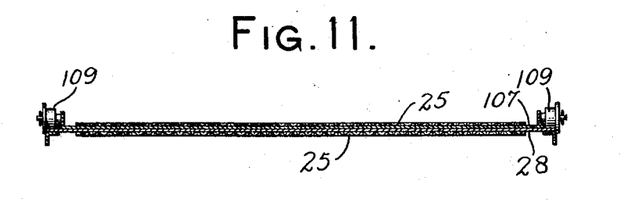
Figure 11 is a transverse section of a detail on the line 11—11 of Figure 5.

As the shaft 49 is rocked, the resulting endwise reciprocation of the links 52, 53 is utilized for reciprocating horizontally the blade 28 and the second delivery point 23, as shown in Figure 2. For this purpose, each of the links 52 and 53 is mounted at its right-hand end (Figure 4) upon a rod 70 which is supported at its opposite ends in depending arms 71, 72 (see also Figure 8). The rod 70 is mounted in blocks on the arms 71, 72, and the blocks are threaded upon screw shafts 74, 74 carrying spiral gears 75, 75 engaged by spiral gears 76, 76 on opposite ends of a shaft 77, which has an extension to the exterior of the machine and there carries a hand wheel 78 (Figure 8). Because the arms 71, 72 and the shafts 70 and 77 are horizontally reciprocated, the shaft 77 extends through a slot 79 in the machine frame, as indicated in Figure 1. By turning the hand wheel 78 in one direction or the other, the arms 71 and 72 are adjusted horizontally in relation to the rod 70, so as to change the position of the arms 71, 72 in relation to the link 52. As will appear more clearly at a later point, the arms 71 are connected with the reciprocable blade 28, which supplies the second delivery point 23, and therefore the described operation of the hand wheel 78 may be employed to adjust the position of the delivery point 23 in relation to the mechanism which reciprocates it, and also to determine the respective positions of that delivery point at the extremities of its horizontal reciprocation.

The two arms 71, 72 are secured respectively to slide bars 80, one end of each of which is supported upon a roller 81 in a guideway 82 on the machine frame, and at another point each slide bar 80 is secured, at 83 (Figure 5), to a horizontally disposed carriage 84, supported for horizontal reciprocation, and carrying at its right-hand end (Figure 5) the edge of the blade 28 which supplies the second delivery point 23. The extremity of the blade 28, at the delivery point 23, is pivotally supported at the lower ends of adjusting screws 85 projecting downwardly from the carriage 84 and provided with thumb nuts 86, by which the screws 85 may be adjusted vertically so as to adjust upwardly or downwardly the delivery point 23 in relation to the carriage 84 and also in relation to the receiving area 24 (Figure 5).

Figure 5:
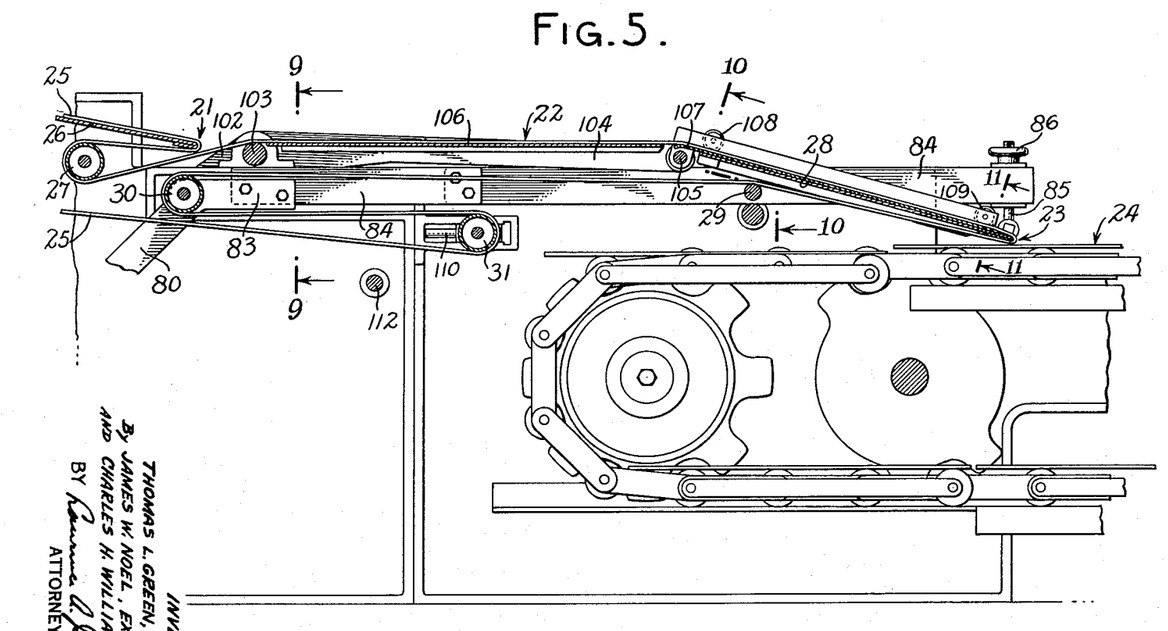

Reading Figures 4 and 5 together: the cam 43 on the shaft 41 is heart-shaped so that during each revolution of the shaft 41, the transmission through the arm 46, rock shaft 49, link 52, arm 71 and slide bar 80, the carriage 84, and finally the delivery point 23, are given one complete cycle of reciprocation. During one half-revolution of the shaft 41, the delivery point 23 is moved forward (toward the right in Figure 5) and during the next half-revolution of the shaft 41 the delivery point 23 is moved rearwardly (toward the left in Figure 5). By adjustment through hand wheel 67 (Figures 1, 6 and 8) the shaft 66, sprocket chain 64, sleeve 62 (Figure 7), gears 61 and 60, and shaft 57 (Figure 4)—the pivotal connection 52a, between the link 52 and arm 50, may be adjusted toward and from the rock shaft 49, so as to vary the amplitude of reciprocation of the delivery point 23, and also for some purposes to vary the extremities of its movement. By the adjustment through the hand wheel 76 and shaft 77 (Figure 4) the position of the delivery point 23 may be adjusted in relation to the link 52 and the other actuating mechanism, so that, at desired stages in the operation of the machine, the delivery point 23 will be positioned properly within a considerable range of adjustment.

The delivery of biscuit from the transfer area 22 over the delivery point 23 occurs during the retreating movement of the delivery point 23, toward the left in Figure 5; i. e., while the receiving area 24 is moving toward the right and the delivery point 23 toward the left. During the advance movement of the delivery point 23 biscuit are to be withheld from delivery, and to suit that purpose the apron supplying the area 22 is held functionally stationary, i. e., is prevented from movement past the delivery point 23, as the latter is being advanced. The manner in which this is accomplished, under various conditions of operation, will appear presently.

The next explanation is devoted to the special compensating or takeup mechanism for varying the length of the upper run of the apron in the rear of the delivery point 23, by means not essentially dependent upon, but capable of being coordinated with, the reciprocation of the point 23. For convenient brevity, this will be called "humping mechanism" because its operation, in the illustrative machine, is characterized by causing a convex "hump" in the upper run of the apron to increase its length at the rear of the delivery point 23, and by diminishing the "hump" to decrease correspondingly the length of the upper run of the apron.

The purpose of the "humping mechanism" is to provide a flexible character of control interposed between the delivery point 23 and the source of the biscuit supply issuing from the biscuit-forming mechanism 40, such that the continuously oncoming upper run of the apron, bearing a succession of biscuit (whether in the form of a dough sheet or peels, or as individual biscuit), may be temporarily stored up, so to speak, and then paid out to suit the varying requirements for the intermittent travel of the biscuit in relation to the delivery point 23. When the humping mechanism increases the length of the upper run of the apron, that has the effect of retarding or arresting the advance of the biscuit in the rear of the point 23. Reversely, when the humping mechanism diminishes the apron length, it has the effect of accelerating the advance of the biscuit. These circumstances are utilized, in conjunction with the reciprocation of the delivery point 23, to determine different relationships between the arrest or travel of the apron and the travel of the delivery point 23, thereby to regulate the discharge of the biscuit over the delivery point 23 in accordance with preconceived requirements. A similar mechanism is shown in the Green and Williams Patent No. 1,868,317, already mentioned; there one species of humping mechanism cooperates with a reciprocating delivery point to deliver an endless dough sheet, whereas in the present machine the biscuit (whether separate or united in a continuous dough sheet) are eventually separated into and dealt with as batches.

Figure 3:
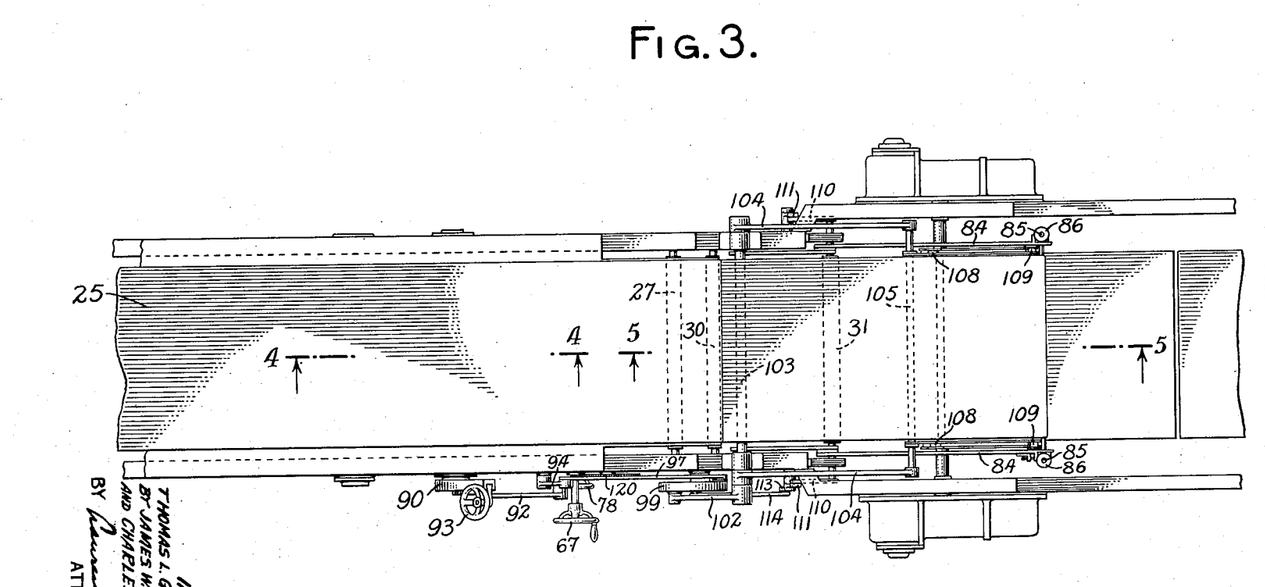
Figure 3 is a plan view of the machine shown in Figure 1.

For these purposes, the present humping mechanism is actuated from the rock shaft 41 (Figures 1, 4 and 6) which is rocked through the cam and roller 43, 44 (Figure 4). On the outside of the machine, as shown in Figure 1, the shaft 41 has fixed thereon a segment 90 in which is adjustably mounted the pivotal connection 91 of a link 92. Through a hand wheel 93 mounted on a worm shaft engaging a worm gear at the end of the link 92, the pivotal point 91 may be moved toward or from, and to either side of, the axis of the rock shaft 49. The opposite end of the link 92 is pivotally connected to a lever 94 having a fixed fulcrum at 95. The upper end 96 of the lever 94 is pivotally connected to a link 97, the opposite end of which, at 98, is pivoted to a rocking cam 99 mounted on a stud shaft 100. The cam 99 consists of an eccentric curved path receiving a roller 101 at one extremity of a lever 102 which is fixed upon a shaft 103 extending across the machine. Near the opposite ends of the shaft 103, and fixed thereon, are the respective levers 104. As shown in Figure 3, the ends of the levers 104, remote from the shaft 103, are connected by a rod 105 extending across the machine beneath the apron area 22. As thus far described, the transmission from the rock shaft 49, through the links 92 and 97, and the cam 99, rock the levers 104 between the full-line and dotted-line positions shown in Figure 1 (subject to considerable adjustments in those positions) and thereby produce and reverse the humping operation. To support part of the apron area 22, and to aid in controlling the humping operation, a plate 106 (Figure 5) is provided, mounted at its transverse edges upon the respective rocking levers 104. Pivotally mounted on the rod 105 is another plate 107 which extends toward the right (Figure 5) and overlies the blade 28, the edge of which supplies the delivery point 23. Through a system of rollers 108, 109 (Figure 5) the plate 107 and the blade 28 are so related that they will be held in close contact with each other, but in slidable relationship. Hence, when the rod 105 is elevated during a humping operation, the plate 107 pivoted thereto, slides upwardly and to the left in relation to the blade 28, and when the rod 105 descends to diminish the hump, the plate 107 slides back upon the blade 28. During all these operations, however, the apron area 22 is supported with substantial continuity from the left-hand extremity of the plate 106 (Figure 5) across the rod 105 and along the top surface of the plate 107 and eventually over so much of the top surface of the blade 28 as is exposed at the time according to the current relationship of the overlying plate 107 and the blade 28.

The upper run of the apron being subject to variation, by the humping mechanism, in the length lying at the rear of the delivery point 23— the lower run of the apron, after it has passed the delivery point 23, is also subject to variations in length, due partly to the humping operation and partly to the reciprocation of the delivery point 23. Hence, the lower run of the apron is equipped with compensating or takeup means. The apron roller 30 (Figures 2 and 5) is mounted upon the horizontally reciprocating carriage 84 and therefore participates in the horizontal reciprocation of the delivery point 23, thereby aiding to take up the lower run of the apron during retreat of the delivery point 23, and to let it out during the advance of the delivery point 23. Additionally, the roller 31 is mounted for horizontal movement to contribute to the compensating and takeup operations under different conditions. This roller 31 has its shaft mounted at opposite ends in horizontally slidable blocks in slideways on the frame of the machine, and those blocks are connected respectively by horizontal links with rocker arms 111 fixed upon the shaft 112. Also fixed upon the shaft 112, on the outside of the frame, is an arm 113 connected by a link 114 to a pin 115 on the cam 99. Thus, when the cam 99 is rocked to cause the humping of the apron area 22, thereby increasing the length of that area, the roller 31 is moved toward the left (Figure 5) to decrease the aggregate length of the lower runs of the apron correspondingly to the increase in length in the upper run. Similarly, when the hump in the upper run is diminished, by rocking the cam 99 in the opposite direction, the roller 31 is moved toward the right in Figure 5 to compensate for the variation in the length of the apron. In the specific machine, this compensating operation is positive, through the described transmission through the arms 111, 112, 113 and 114 and the cam 99; and that operation is synchronized with the action of the humping levers 102 and 104, because the two operations are actuated in predetermined relationship by the cam 99 and rock shaft 100.

In the illustrative machine, the single rock shaft 49 actuates both the horizontal reciprocation of the delivery point 23, and the described humping mechanism. Accordingly, these two operations may be maintained in synchronism, once they have been given desired adjustment, so that the positive and negative humping and the delivery point reciprocations may be made to occur in a wide range of useful sequences and relationships. In the conditions of adjustment shown in Figures 1, 4 and 5 (excluding the dotted-line position shown in Figure 1) the delivery point 23 stands at the left-hand extremity of its reciprocation, and the humping has been reduced to a minimum, the rearward movement of the delivery point 23 and the downward movement of the rod 105, at the apex of the humping mechanism, having occurred concurrently. Subsequently, with these same adjustments, the advance movement of the delivery point 23 would concur with a positive humping movement, and so on.

If, however, through the hand wheel 93 (Figure 1) the pivot point 91 of the link 92 were moved downwardly to the opposite side of the axis of the rock shaft 49, the relationship of the delivery point movement and the humping movements would be reversed; that is, the positive humping would occur during the retreat of the delivery point, while the negative humping would occur during its advance.

The application of the described operations, under different conditions of adjustment, to a variety of different purposes, will be described with reference to the diagrams in Figures 12 to 16A inclusive.

First, however, it should be pointed out that the various adjustments described above may be made or modified while the machine is in full high-speed operation, without interrupting the flow of biscuit or necessarily reducing the speed thereof. This is highly desirable for the purpose of maintaining the desired coordination and synchronization of the various operations.

It is practicable also to provide for the preliminary setting of certain adjustments by reference to a dial or index. For example: Figure 1 shows a dial 120 mounted on a stud shaft in the frame of the machine, the circular periphery of the dial being toothed to engage a pinion on the shaft of the gear wheel 67 through which the positional adjustment of the reciprocating delivery point 23 is effected. The dial 120 is suitably graduated to indicate desired relationships of the delivery point 23 to other parts, in different phases of adjustment.

In the operation of the illustrative machine, the biscuit resting upon the main delivery area 20 are delivered in continuous succession over the first delivery point 21 and onto the transfer area 22. When the linear speeds of these two areas are maintained equal, as when both areas are supplied by the single apron 25 or are otherwise driven at constant speed, the biscuit will be deposited upon the transfer area 22 in the same relationships in which they were arranged upon the delivery area 20. For instance, whether the biscuit are in the form of cut-out individual cakes or are in more or less integral sheets or peels, they may remain in these same relationships on the transfer area 22.

The biscuit are delivered from the transfer area 22 to the receiving area 24 in batches. For instance, when the receiving area 24 is composed of a succession of pans, each delivered biscuit batch may be of a size appropriate to the dimensions of a pan. By reason of the adjustments provided in the machine, batches may be dealt with in a variety of different lengths, within a considerable range; and also the relationships of biscuit in each batch, when deposited on the receiving area 24, may be predetermined so as to be the same as on the area 20, or closer together or farther apart longitudinally of the area 24. That is to say, integral sheets or peels may be delivered onto the area 24 without stretching or wrinkling; or individual biscuit may be placed close together or may be spaced apart, longitudinally, regardless of their original relative positions on the area 20.

Since the operation deals with the biscuit in batches, it is important to predetermine accurately the relationship between the rear edge of each batch and the advance edge of the next following batch, either to leave spaces between adjacent batch ends appropriate to intervals between pans, or to deposit batches with their edges in desired proximity if the receiving area 24 is supplied by a continuous oven band or the like.

The several requirements referred to are supplied, under numerous illustrative conditions of adjustment, as indicated in the diagrams of Figures 12 to 16A inclusive.

Figure 12:
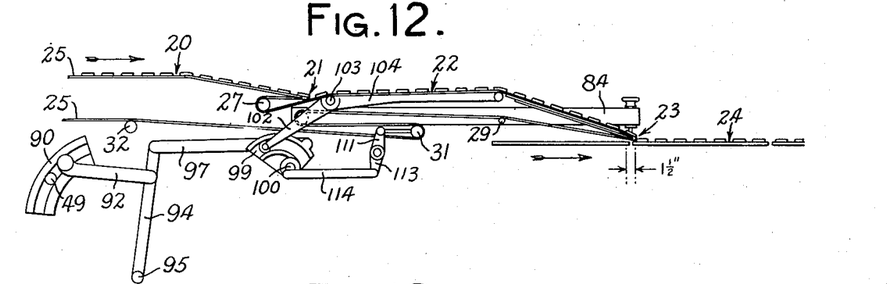
Figures 12 to 16A are diagrams, in side elevation, arranged in pairs, Figures 12 and 13, for example, for comparison to show different modes of operation of the machines under various conditions of adjustment.
Figure 13:
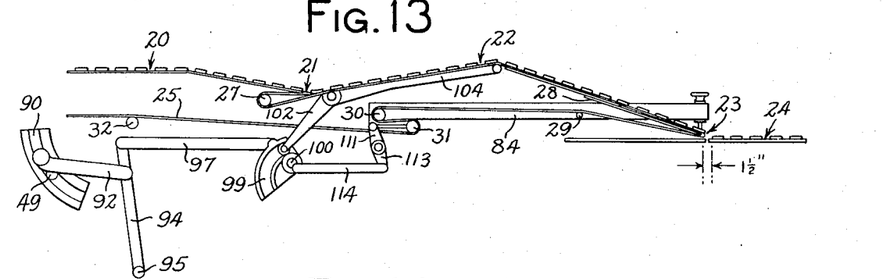

Referring now to Figures 12 and 13: For convenience in explanation it will be assumed that the receiving area 24 is supplied by a succession of pans each 25 inches in length, and that each pan is intended to receive a biscuit batch of approximately 24 inches in length; the rear edge of each pan is separated one-half inch from the advance edge of the next pan. On these assumptions, each 24-inch biscuit batch may be centered on its 25-inch pan so as to leave a one-half inch pan margin at each front and rear end, and the rear end of the biscuit batch on each pan will be spaced 1.5 inches from the advance end of the batch on the next following pan.

Figure 12 shows the parts when they have just completed the deposit of a 24-inch biscuit batch on a pan. That deposit has been accomplished by moving the receiving area 24 toward the right and by causing 24 inches of the apron area 22 to pass over the delivery point 23 and thereby discharge a 24-inch batch onto the area 24. This has been effected by the simultaneous advance of the area 24 toward the right, and retreat of the delivery point 23 toward the left, while the required 24 inches of the apron area 22 has been passing the point 23.

The described depositing operation began at a time when the delivery point 23 and an empty pan stood in the relationship shown in Figure 13, the point 23 being then approximately one-half inch to the rear of the advance end of the empty pan. Thus Figure 13 indicates the moment of beginning the deposit of a batch, when the point 23 is at the extremity of its advance movement, while Figure 12 indicates the completion of a deposit when the point 23 is at the extremity of its retreating movement. Also Figure 12 shows the humping mechanism as having the minimum hump while Figure 13 shows the maximum hump, for the purposes of the particular example.

It is assumed that the receiving area 24 is moving at constant speed throughout the operation of the machine, and that the travel of the apron area 22 over the point 23, during the deposit of a batch, should take place at that same constant speed in order to deposit the batch without changing the relationships of the individual biscuit or stretching or crowding a peel. To suit these purposes and to change the positions of the parts from those shown in Figure 12 to those shown in Figure 13, the adjustment through the hand wheel 67, controlling the threaded shaft 54 (Figure 4) is so made as to cause the delivery point 23 to advance (from Figure 12 position) at a speed slightly slower than speed of the receiving area 24 so that, while the point 23 is moved from Figure 12 position to Figure 13 position, the area 24 will have moved a little faster so that it will have traversed a distance 1½ inches greater than the distance of advance of the point 23, thereby producing the effect of "skipping" past the point 23, the rear margin of the preceding pan, the interval between the two pans, and the margin of the next following pan, to the position shown in Figure 13.

During this advance of the point 23, no biscuit are delivered thereat, in the present machine; and that requires the apron area 22 to be functionally stationary relative to the point 23, during the necessary period, in spite of the fact that the apron is continuously driven at a constant speed exceeding the speed of advance of the point 23. This result is produced by the humping mechanism which, during the advance movement of the point 23, serves to add an increment of length to the upper run of the apron, in the rear of the delivery point 23, which increment is sufficient to take up part of the length of the oncoming apron, while the apron at the point 23 advances at the same relatively low speed as the point 23, so that the apron is at rest in relation to that point. The adjustment of the humping mechanism for this purpose is effected through the hand wheel 93 (Figure 1). To express it differently, this positive humping operation in effect reduces the linear speed of the apron area 22 adjacent the delivery point 23, so that the apron speed is made equal to the speed of advance of the point 23 and the two are relatively stationary.

For example: Assume that the 25-inch pan moves 12.75 inches between the respective positions of Figures 12 and 13. To suit that movement, the mechanism for reciprocating the point 23 would be adjusted to advance the latter through 11.25 inches in the same time period so that the area 24, during that period, will have moved 1.5 inches farther than the delivery point 23, thereby producing the effect of a "skipping" operation and predetermining a distance of 1½ inches between the rear edge of the deposited batch and the advance edge of the next batch about to be deposited, i. e., to bring the parts into the position of Figure 13.

During these movements, however, the linear speed of the apron 25 has been such that it will have moved 12 inches while the delivery point 23 has been advanced only 11.25 inches. In the absence of the humping mechanism, therefore, .75 of an inch of the apron would have moved past the point 23. To avoid that movement, the humping mechanism is adjusted so that during the advance of the point 23, the length of the area 22 will be increased by an increment of .75 inch, which increment, added to the 11.25-inch advance of the point 23, offsets the 12-inch linear movement of the apron 25, thereby maintaining the advance edge of the apron in fixed relation to the point 23. The humping movement is performed gradually by the cam 99 (Figure 1) so that there is no material jolting or jarring of the biscuit on the area 22, and the action is simply the gradual taking-up of the oncoming apron to hold it at rest at the point 23.

After the parts have taken the position shown in Figure 13, a depositing action then begins due to the continued advance of the receiving area 24, the retreat of the delivery point 23, and the travel of the apron area 22 over that point, the ultimate purpose, in the hypothetical case, being to deposit a 24-inch batch of biscuit on the pan.

This means that the aggregate relative movement between the pan and the point 23 should be 24 inches; and that relative movement will have two components—one the advance of the pan, and the other the retreat of the delivery point 23. In view of the illustrative design of the cam 43 (Figure 4) the retreat of the delivery point 23 will be equal in distance to its previous advance, namely 11.25 inches; and that retreat will consume the same period of time as the previous advance. Hence, since the receiving area 24 is moving at constant speed, it will have advanced 12.75 inches, while the delivery point 23 is retreating 11.25 inches, making a total relative movement of 24 inches, which is the intended result.

During this operation, 24 inches of the apron area 22 should pass over the delivery point 23, in order to deposit the 24-inch batch; but during the period, the linear advance of the apron would have been only 12 inches, while the retreat of the delivery point 23 would have released only 11.25 inches of the apron, making a total of 23.25 inches of apron, which from these two causes, would have been made to travel past the point 23. The negative humping operation, however, gradually reduces the length of apron between the points 21 and 23, during the retreat of the latter, and thereby pays out the apron toward the point 23, permitting the takeup mechanisms on the lower run to pull an increased length past the point 23, so that an increment of .75 of an inch is added by the negative humping to the 23.25 inches referred to above, with the ultimate result that the desired 24 inches of apron passes over the point 23 to correspond with the 24-inch length of the pan which is exposed to receive the biscuit batch, by the relative movement of the pan and the point 23.

From the foregoing, it will be evident, that while the speed of the receiving area 24 may be maintained uniform, the conditions of delivery to that area may be widely varied by adjusting and coordinating in numerous ways the three factors of the reciprocation of the delivery point 23, which is variable in both speed and extent; the positive and negative humping operations, which are variable within a wide range; and the linear speed of the apron 25 in the areas 20 and 22 which may be regulated to reconcile it with the speed of the receiving area 24, while the speed and extent of travel of the apron in the rear of the delivery point 23 may be modified to coordinate it with the other factors, by means of the humping operations.

Figure 14:
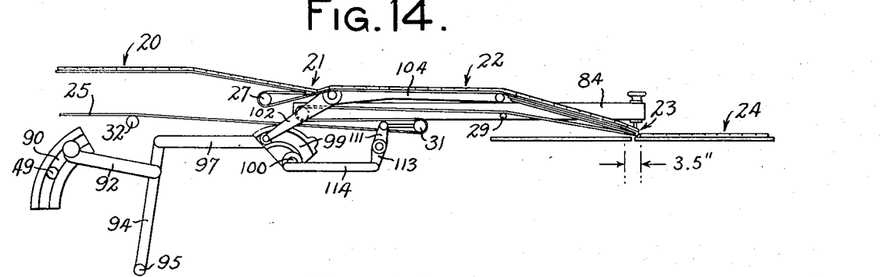
Figure 14A:
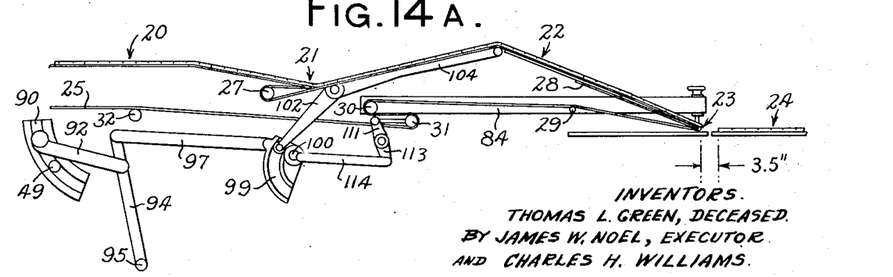

Figures 14 and 14A are based upon the assumptions that it is desired to deposit biscuit batches each 24 inches long upon pans each 27 inches long, with a distance of 3.5 inches between each batch and the next. To suit these purposes certain adjustments are necessary. The reciprocation of the delivery point 23 is modified, through the hand wheel 67 (Figure 1), to move the pivot point 52a (Figure 4) closer to the shaft 49 to reduce the speed and distance of advance of the delivery point 23 so that, while the receiving area 24 is advancing 13.75 inches (i. e., one-half the distance between pan centers) the point 23 will have advanced only 10.25 inches, the result being that, in moving from the relationships of Figure 14 to those of Figure 14A, the receiving surface 24 will have moved 3.5 inches farther than the point 23 to determine the interval of 3.5 inches between the rear end of the batch just deposited and the advance end of the batch about to be deposited. During that movement, it is assumed that the apron 25 has moved linearly through 12 inches, the apron speed having been adjusted for that purpose. This means that the linear advance of the apron has exceeded by 1.75 inches the simultaneous advance of the point 23, but that differential is compensated by the humping operation which has been adjusted (to considerably greater amplitude than in Figures 12, 13) so as to add an increment of 1.75 inches to the length of the apron area 22 between the points 21 and 23. In other words, the 12-inch linear advance of the apron has been offset by the 10.25-inch movement of the point 23 plus the 1.75-inch increment interposed by the humping. This maintains the advance margin of the apron in fixed relation to the point 23 until the parts arrive at the positions shown in Figure 14A.

Thereafter, the point 23 is retreated 10.25 inches while the pan advances 13.75 inches, the total relative movement being, therefore, 24 inches appropriate to the intention to deposit a 24-inch batch of biscuit; and concurrently the linear advance of the apron is 12 inches, the retreat of the point 23 releases 10.25 inches of the apron, and the negative humping operation subtracts the increment of 1.75 inches so that in effect the total movement of the apron over the point 23 amounts to the 24 inches required to deposit the desired batch.

The facility and precision of adjustment is such that a peel of biscuit, as illustrated in Figures 14 and 14A, may be deposited from the area 22 onto the receiving area 24 with minimum, if any, tendency to stretch or wrinkle. And, as will be evident to those familiar with the art, there is a wide range of adjustment between and beyond those illustrated in Figures 12 to 14A, which may be availed of to suit a great variety of different purposes. These adjustments may be made while the machine is in full operation in order both to change and to correct the relationships of the parts in the various stages of successive cycles.

Figure 15:
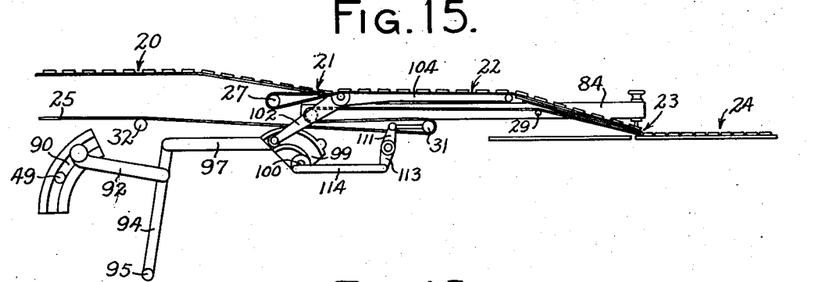
Figure 15A:
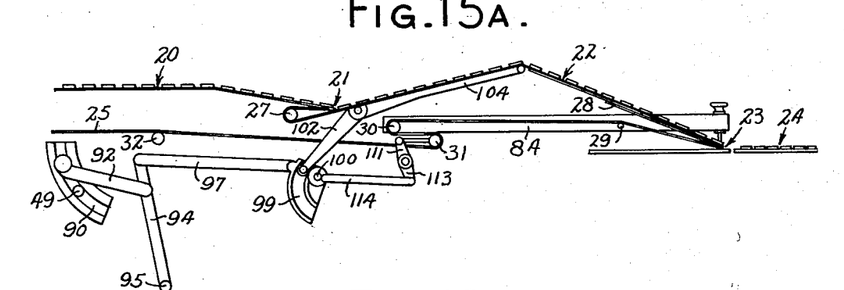

Thus far it has been assumed that biscuit are to be deposited on the receiving area 24 in the same relationships, in each batch, which they had upon the main delivery area 20. For comparison, Figures 15 and 15A illustrate conditions when it is desired to deposit biscuit closer together, longitudinally, on the receiving area 24 than they were on the area 20. For instance, it will be assumed that a batch which was 28 inches long on the area 20 is desired to be compacted, so to speak, into a batch 24 inches long on a pan 27 inches long, with a distance of 3.5 inches intervening between adjacent edges of batches. The problem is, in general terms, to deliver biscuit over the point 23 more rapidly than they are carried away on the area 24.

Again it is assumed that the area 24 advances through 13.75 inches while the point 23 is advancing through 10.25 inches, so that the former moves 3.5 inches farther during the period than the point 23 moves, to produce the 3.5-inch interval between the deposited batch and the advance edge of the batch about to be deposited, as in Figure 15A.

During the ensuing depositing operation, the relative motion between the advancing area 24 and the retreating point 23 should be adjusted (as in Figures 14 and 14A) so that a 24-inch area of the pan will be exposed to receive the deposited biscuit. Hence, while the pan is advancing 13.75 inches the point 23 is retreated 10.25 inches, a total relative movement of 24 inches. To provide, however, for delivering a 28-inch batch to the 24-inch pan length, the speed of the apron 25 must be increased somewhat so that its linear movement will be 14 inches during the period required for the 10.25-inch advance of the point 23, and the corresponding 13.75-inch advance of the area 24. This calls for an adjustment of the humping operation such that the positive humping will add an increment of 3.75 inches to the length of the apron in the rear of the point 23, which increment, added to the 10.25-inch advance of the point 23, makes a total of 14 inches, to maintain a fixed relationship between the point 23 and the edge of the apron thereat, which fixed relation is maintained during movement of the parts from the Figure 15 positions to the Figure 15A positions.

During the ensuing depositing operation, while the relative movement of the point 23 and the area 24 is exposing 24 inches of pan, it is required to pass 28 inches of the apron over the point 23. This is effected by the composite operation of the three factors—the linear advance of the apron through 14 inches; the retreat of the point 23 through 10.25 inches; and the negative humping which subtracts from the length of the area 22 the increment of 3.75 inches, a total of 28 inches.

Figure 16:
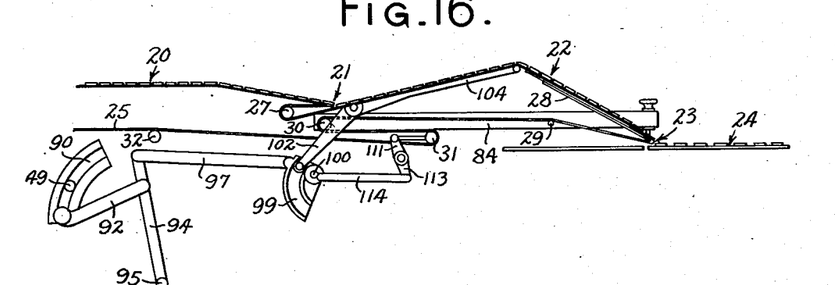
Figure 16A:
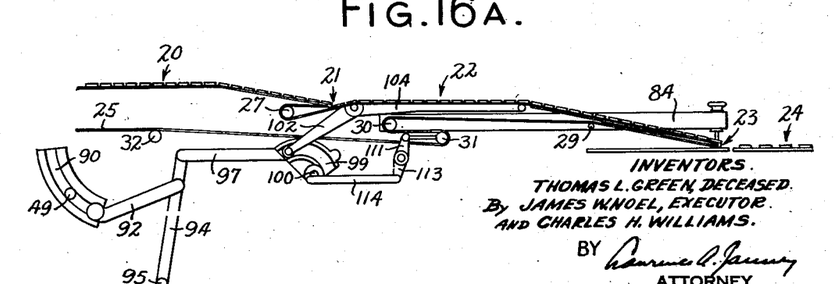

In some instances it is desired to deposit biscuit in each batch farther apart on the area 24 than they were on the apron, and one set of operations for this purpose is illustrated in Figures 16 and 16A. Here, through the hand wheel 93 (Figure 1) the pivot point 91 through which the humping mechanism is actuated, is adjusted to the opposite side of the shaft 49 from its positions in Figures 12 to 15A, so as to reverse the sequence of reciprocation of the point 23 and the humping operations. That is to say, in Figures 16 and 16A, the positive humping occurs during the retreat, or depositing movement, of the point 23, while the negative humping occurs during the advance of the point 23. It is assumed that a batch of biscuit 18 inches in length is to be spread over a 24-inch length of pan. For this purpose the speed of the apron 25 is reduced so that its linear advance will be only 9 inches during the 10.25-inch advance of the point 23, and the 13.75-inch advance of the area 24. To maintain a fixed relationship between the point 23 and the front edge of the apron under these circumstances, it is necessary to reduce the length of the area 22 between the points 21 and 23 by a negative increment of 1.25 inches, which in effect increases the 9-inch advance of the apron enough to make it total 10.25 inches to equal the advance of the point 23. This is effected by the described adjustment of the humping mechanism such that while the point 23 is retreating, an increment of 1.25 inches is added to the length of the area 22 and is then subtracted therefrom (Figure 16A) during the advance of the point 23.

When the depositing movement begins (Figure 16A) the receiving area 24 advances 13.75 inches while the point 23 retreats 10.25 inches, a total relative movement of 24 inches. Simultaneously, the apron advances linearly through 9 inches, the retreat of the point 23 withdraws 10.25 inches of the apron, a total of 19.25 inches, but at the same time the positive humping adds 1.25 inches to the length of the area 22 and in effect subtracts that increment from the 19.25-inch total, leaving 18 inches of apron which in fact pass over the point 23 to spread an 18-inch batch on the 24-inch length of pan.

One form of the invention has been described in connection with the use of pans, entailing what is generally called a "skipping" operation which, broadly speaking, is intended to predetermine a space between one biscuit batch and the next, and thereby to avoid depositing any biscuit in too close proximity to the edges of pans or the spaces between pans. The invention, however, is readily applicable to the deposit of biscuit in successive batches, upon a continuous oven band or the like, with no distinguishable intervals between one batch and the next. For instance, referring to Figures 12 and 13, the adjustment of the speed of movement of the point 23 may be so related to the preferably constant speed of movement of the receiving area 24, as to predetermine any desired relationship between the rear end of one batch on the area 24 and the advance end of the next.

In the course of the foregoing description, several references have been made to adjustments in the speed of the apron 25. As will be understood by those skilled in the art, that adjustment may be produced in various ways, as for instance by the apron speed adjustment shown in Green United States Patent No. 1,939,810, dated December 19, 1933. Similarly, change-speed mechanisms may be interposed in the present machine for various purposes, as illustrated in said Green Patent No. 1,939,810.

It is to be understood that the invention is not limited to the embodiment in the particular construction and organization above described by way of example. Also, it is not necessary that all the features of the invention be used conjointly. On the contrary, different features of the invention may be embodied in various combinations and subcombinations as defined in the subjoined claims.

We claim:

1. A machine for handling biscuit dough comprising, in combination, apron means for conveying dough, having a main area and a transfer area; a stationary delivery point interposed between said main area and the transfer area; a reciprocatory delivery point at the delivery end of said transfer area; humping means acting upon the dough-conveying run of the apron means in advance of the reciprocatory delivery point, to vary the effective length of the apron means; actuating mechanism respectively for said humping means and for reciprocating said delivery point; means coordinating the operations of said actuating means; and respective adjustment means for adjusting, independently of each other, the operations of said actuating means.

2. A machine for handling biscuit dough comprising, in combination, apron means for conveying dough, having a main area and a transfer area; a stationary delivery point interposed between said main area and the transfer area; a reciprocatory delivery point at the delivery end of said transfer area; humping means acting upon the dough-conveying run of the apron means between the stationary point and the reciprocatory point, to vary the effective length of said apron means; actuating mechanisms for said humping means and for reciprocating said delivery point; and means coordinating the operations of said actuating means.

3. A machine for handling biscuit dough comprising, in combination, apron conveyor means having a main area and a transfer area; a stationary delivery point over which dough is delivered from the main to the transfer area; a reciprocatory delivery point over which dough is delivered from the transfer area; a humping mechanism in advance of the reciprocatory delivery point; actuating means operating said humping mechanism to regulate the linear travel of the apron in said transfer area; actuating means for reciprocating the delivery point; and means coordinating said respective actuating means to cause and to interrupt delivery at said delivery point.

4. A machine for handling biscuit dough comprising, in combination, a continuously traveling apron having a dough-supporting upper run, and a lower run; a reciprocating delivery point interposed between the upper and lower apron runs; a humping mechanism acting upon the upper run of the apron in the rear of said delivery point, to take up the oncoming apron and let it out in coordination with reciprocations of said delivery point; actuating means operating the humping mechanism to take up the oncoming apron during retreat of the delivery point, and to pay out the apron during advance of the delivery point; and means to reverse the operation of the humping mechanism relative to the reciprocation of the delivery point.

5. A machine for handling biscuit dough comprising, in combination, a traveling receiving means; a traveling apron to deliver dough to said receiving means; a reciprocating delivery point for the apron; humping means acting upon the upper run of the apron; takeup means acting upon the lower run of the apron; actuating mechanisms for the reciprocatory delivery point and for the humping means; and adjusting means for regulating apron travel over said delivery point at speeds the same as, or greater or less than, that of the traveling receiving means.

6. A machine for handling biscuit dough comprising, in combination, a traveling receiving means; a traveling apron to deliver dough to said receiving means; a reciprocating delivery point for the apron; actuating means for the reciprocatory delivery point; and adjusting means for regulating apron travel over said delivery point at speeds the same as, or greater or less than, that of the traveling receiving means.

7. A machine for handling biscuit dough comprising, in combination, traveling receiving means; a traveling apron to deliver dough to the receiving means; a delivery point over which said apron passes; means driving the apron at a linear speed different from that of the receiving means; mechanism acting upon the apron to take it up and let it out in the rear of the delivery point; and means for varying the operation of said mechanism to make the speed of travel of the apron over said delivery point equal to, or greater or less than, the speed of the receiving means.

8. A machine for handling biscuit dough comprising, in combination, traveling receiving means; a traveling apron to deliver dough to the receiving means; a delivery point over which said apron passes; means driving the apron at a linear speed different from that of the receiving means; takeup and let-out mechanism acting on the apron; and actuating means for said mechanism to regulate the speed of travel of the apron at the delivery point.

9. A machine for handling biscuit dough comprising, in combination, traveling receiving means; a traveling apron to deliver dough to the receiving means; a reciprocating delivery point over which said apron passes; means driving the apron at a linear speed different from that of the receiving means; means reciprocating the delivery point at a linear speed different from that of each of the apron and receiving means; and takeup and let-out mechanism acting on the apron to coordinate said three speeds.

10. A machine for handling biscuit dough comprising, in combination, receiving means; a traveling apron for delivering dough to the receiving means; a reciprocatory delivery point around which the apron passes; means to adjust reciprocation of the delivery point in both speed and extent; humping mechanism acting upon the apron; means to vary the amplitude of the humping operation; means to drive the apron; and means to vary the speed of travel of the apron relative to the speed of the receiving means.

JAMES W. NOEL,
*Executor of the Estate of Thomas L. Green, Deceased.*

CHARLES HERBERT WILLIAMS.